United States Patent [19]

Lewis

[11] Patent Number: 5,636,344
[45] Date of Patent: Jun. 3, 1997

[54] NETWORK FAULT ANALYSIS SYSTEM

[75] Inventor: Simon C. R. Lewis, Bristol, England

[73] Assignee: Hewlett-Packard Company, Palo Alto, Calif.

[21] Appl. No.: 748,529

[22] Filed: Aug. 22, 1991

[30] Foreign Application Priority Data

Aug. 31, 1990 [GB] United Kingdom .................. 9019017

[51] Int. Cl.$^6$ ...................................................... G06F 17/00
[52] U.S. Cl. ........................................................ 395/200.11
[58] Field of Search ...................... 371/15.1, 20.1, 371/29.1, 68.2; 395/53, 51, 908, 909, 917, 185.01, 200.02, 200.11; 364/514, 578, 579, 580; 370/17; 375/10

[56] References Cited

U.S. PATENT DOCUMENTS

| | | | |
|---|---|---|---|
| 4,881,230 | 11/1989 | Clark et al. ............................ | 395/917 |
| 4,964,125 | 10/1990 | Kim ....................................... | 395/53 |
| 4,972,453 | 11/1990 | Daniel, III et al. .................... | 379/10 |
| 5,175,800 | 12/1992 | Galis et al. ............................. | 395/51 |
| 5,428,619 | 6/1995 | Schwartz et al. ..................... | 395/185.01 |

FOREIGN PATENT DOCUMENTS

| | | |
|---|---|---|
| 0338561A2 | 10/1989 | European Pat. Off. . |
| 0468754A2 | 1/1992 | European Pat. Off. . |

OTHER PUBLICATIONS

M. Feridun, et al., "ANM: Automated Network Management System", Mar., 1988, vol. 2, No. 2, IEEE Network, pp. 13–19.

"Method For Transferring Collected Data Between Rule Bases of Expert Systems"; IBM Tech. Disclosure, vol. 28 No. 8, Jan. 1986.

AI Review; "A Generic Framework For Blackboard Applications"; Blackboard Technology Group, Summer of 1990.

Sugawara; "A Cooperative LAN Diagnostic and Observation Expert System", IEEE 1990.

Marques; "A Symptom–Driven Expert System For Isolating and Correcting Network Faults"; IEEE Com Mar. 1988.

M. Feridun et al., "ANM: Automated Network Management System", *IEEE Network*, vol. 2, No. 2, Mar. 1988.

*Primary Examiner*—Ellis B. Ramirez

[57] ABSTRACT

Apparatus for monitoring and analyzing the behavior of a message network. Such an apparatus in accordance with the invention comprises a plurality of expert systems (Consultants), each of which is concerned with a different one of the several operations normally involved in the analysis of any given network problem, and communication device. The communication device is preferably in the form of an electronic blackboard by means of which deductions can be passed between the Consultants under control of the user. The user may also add information to the electronic blackboard. In a preferred embodiment, the Consultants include a Fault Recognizer Consultant fed with raw data from the message network and which generates Problem suggestions therefrom; a Usage Advisor Consultant which suggests where to test and what to test for; an Operations Assistant Consultant which suggests how to make the tests; a Expert Commentator Consultant which analyzes the results of the tests to produce Symptoms; and a Diagnostician which generates possible and plausible diagnoses of the observed fault conditions, together with explanations. In practice, there is likely to be a roughly cyclic sequence of activation among the Usage Advisor, the Operations Assistant, and the Expert Commentator, with the Diagnostician performing a kind of supervisory or higher level role.

14 Claims, 3 Drawing Sheets

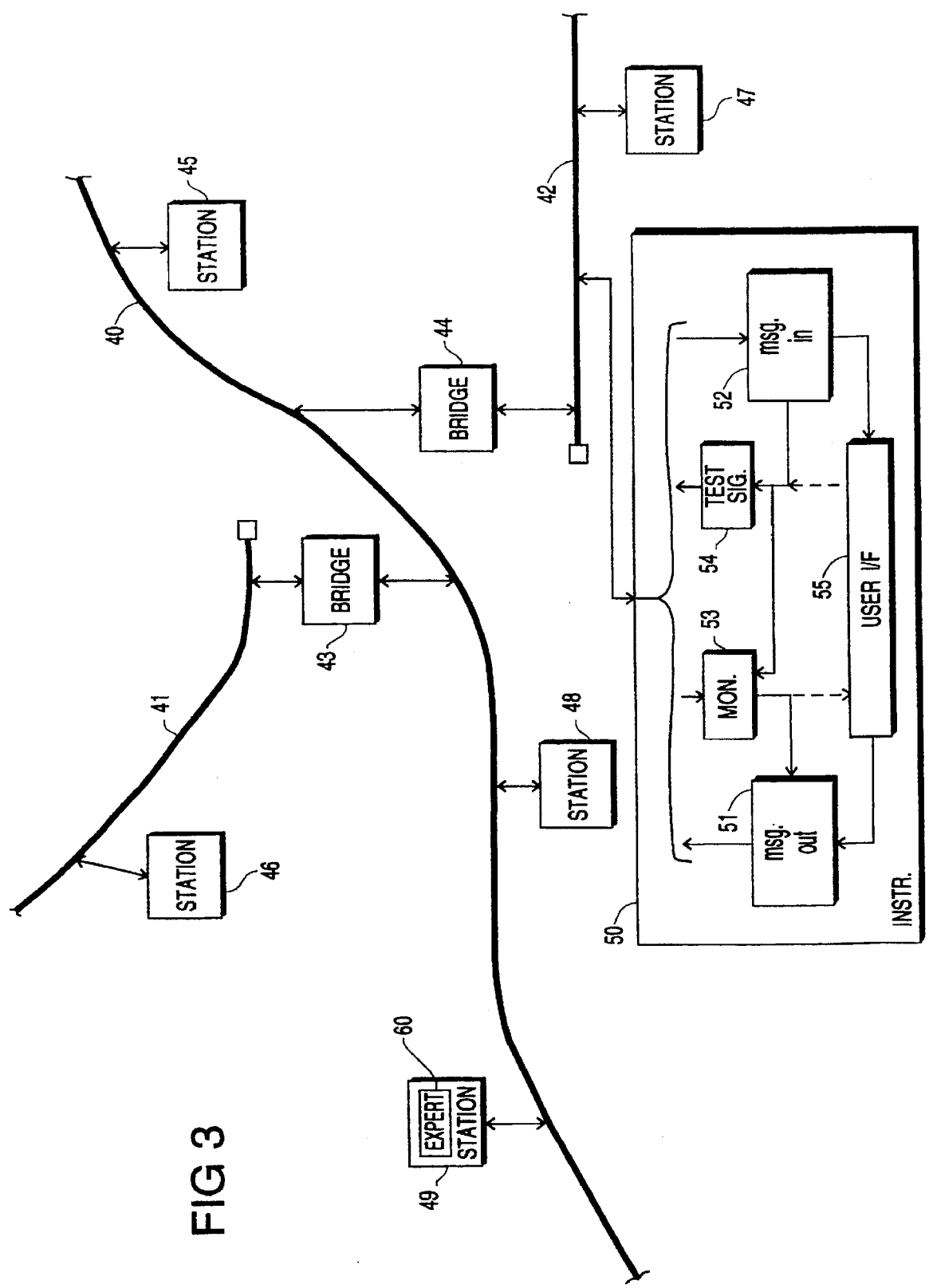

NETWORK FAULT ANALYSIS SYSTEM

BACKGROUND OF THE INVENTION

1. Field of the Invention

The present invention relates to a system for analyzing faults on computer and like message networks.

2. Description of the Prior Art

A message network is a network (which may or may not include nodes performing switching functions) interconnecting a plurality of data processing devices. Such networks are often used to interconnect a number of computers, but can also be used for other data communication purposes, such as telephone-type networks. In such a network, information is generally transmitted in the form of discrete packets, and the routing of the packets is at least partially controlled or determined by the various nodes in the network. In some cases, the route taken by the packets is set up for the message and all packets follow that route; in others, the various packets of a message may follow different routes through the network. Usually, a number of packets of different messages will be interleaved on any particular link between two adjacent nodes in the network.

Such networks are liable to suffer from faults. The cause and/or effect of a fault may both be immediately evident. For example, the physical linkage between two nodes may be interrupted or no packets may be received from a particular node. However, network faults are often subtle in both their causes and effects, and it may not be clear whether there is a fault or not. For example, a poor response time of the network may be due to a fault or it may be due to an unusual and extreme workload imposed on it.

A variety of instruments are available for network fault diagnosis, where the term "diagnosis" is used in a broad sense. At the lowest level, there are voltage level testers, continuity testers and the like. At a slightly higher level, there are signal presence testers such as LED instruments. However, many network faults occur at a high level, and their diagnosis requires inspection of the network at a correspondingly high level, involving the observation of packets and packet types. This can be achieved by means of protocol analyzers. However, the use of protocol analyzers has two difficulties. One is that the setting up of the analyzer is a skilled task, requiring a long training and learning period before it can be used effectively. The other is that the output from the analyzer is generally in a form which is not directly intelligible and requires considerable further analysis before its implications for the health of the network can be understood.

At the highest level, network management systems take a wider view of a network and provide a number of network management services such as fault management, configuration management, accounting, performance analysis, security and resource management. These systems generally comprise distributed data gatherers located at various key points around the network and one or more centralized management stations for receiving and analyzing data on network operation from the data gatherers. One such system is the ANM (Automated Network Management) system described in the article "ANM: Automated Network Management System" by M Feridun, M Leib, M Nodine and J Ong, *IEEE Network*, March 1988- Vol 2, No 2. In the ANM system, network entities, such as gateways, provide data to a backbone of Distributed Management Modules (DMMs) which service 'Clients' that provide the network management services referred to above. Clients request and receive raw data collected from network entities by the DMM backbone and can also request the DMM backbone to execute specific actions. Specialized Clients can be provided such as a fault management Client that detects, diagnoses and recovers from network faults.

Because of the complexity of the network management task, the ANM system uses artificial intelligence techniques to represent and organize its network expertise, invoke relevant network analyses and annotate its reasoning to support later explanations to the network operator. More particularly, a Client called the Intelligent Network Manager is provided with a collection of expert systems (Experts) organized as a top-level Expert which forwards triggering data received from the network entities to other Experts that each understand a specific kind of network problem. These Experts, in turn, may suggest possible hypotheses that might explain the triggering data. If necessary, each Expert may request additional data from network entities. When Experts suggest, confirm or reject hypotheses, the network operator is informed. However, to add expertise about a new type of network problem to the Intelligent Network Manager of ANM, a new Expert must be added to the system, and to change the way the system reasons about problems, all Experts conducting such reasoning must be changed. It will be appreciated that network management systems such as the ANM system are conceived on a much larger scale and require considerably greater investment than instruments such as protocol analyzers intended for localized use. These two approaches to network fault analysis thus are largely complimentary rather than competitive.

Accordingly, it is an object of the present invention to provide an improved network analysis system which eases the problems of interpretation of collected data and which can be implemented as a portable instrument, at least in its less complex embodiments.

SUMMARY OF THE INVENTION

According to one aspect of the present invention, there is provided a system for analyzing faults on a message network, where the system comprises a network interface for coupling the apparatus to the network, expert system means for monitoring and interacting with the network through the network interface for the purpose of analyzing faults on the network, and a user interface for outputting to the user fault-analysis information provided by the expert system means. Preferably, the expert system means comprises a plurality of individual expert systems and communication means through which information can be passed between the expert systems. Each expert system is operative to carry out a respective one of the several operations normally involved in the analysis of any given network fault. A first group of one or more of the expert systems is involved in the instigation of tests on the network through the network interface and a second group of one or more of the expert systems is involved in monitoring the network through the network interface and in analyzing the network's behavior including behavior exhibited in response to the tests, while the communication means provides information from the second group back to the first group to enable the latter to instigate, as appropriate, tests taking account of the network's behavior. The user interface provides user access to at least one expert system in each group so as to facilitate these tests.

The term "expert system" is used herein in a broad sense, as synonymous with "knowledge based system". The allocation of so-defined expert systems to different tasks in the problem-analysis domain rather than to respective technical domains provides a powerful analysis tool since a user, who naturally reasons along similar lines, is better able to assess the information provided and, preferably, also to participate in the problem analysis process. Furthermore, because human experts from whom knowledge must be elicited for the expert systems also think in a similar manner, the process of knowledge elicitation is also facilitated. The effectiveness of the expert-system architecture is further enhanced by its iterative nature.

Although the preferred implementation of the apparatus of the invention is as a portable instrument, other implementations are possible. Indeed, in order to maximize the processing power available for running the expert systems, the latter could be installed on one or more network processors at fixed locations on the network, while the network and user interface of the apparatus are retained in a portable instrument. In this case, appropriate means are provided to enable the parts of the apparatus in the instrument to communicate with the expert systems preferably over the network under analysis.

The network interface of the apparatus preferably includes test and measurement means for carrying out the tests on the network, under the control of the expert systems, either directly or indirectly through the intermediary of the user. However, the tests instigated by the expert systems could alternatively be carried out by remote network resources.

Preferably, the first group of expert systems comprises expert systems including a Usage Advisor operative to produce proposals for the tests, including observing particular conditions in the network, and an Operations Assistant which generates information regarding the appropriate manner in which to carry out the tests. In this case, the user can advantageously access the Usage Advisor and the Operations Assistant to propose tests independently of the Usage Advisor and to have the Operations Assistant generate information regarding how to carry out the user-proposed tests. The Usage Advisor may also propose tests which the user may then carry out independently of the Operations Assistant.

Preferably, the second group of expert systems comprises expert systems including a Fault Recognizer responsive to the network's behavior independent of test stimuli, to identify network problems therefrom, an Expert Commentator responsive to the network's behavior resulting from the test to identify higher level fault behavior information, and a Diagnostician which is fed with the network problems and/or higher level behavior information to generate fault hypotheses therefrom.

The functions of the aforesaid expert systems can be briefly summarized as follows. The Usage Advisor suggests where to test and what to test for; the Operations Assistant suggests how to make the tests; and the Expert Commentator analyzes the results of the tests to produce symptoms. The Operations Assistant is concerned with converting the deductions of other expert systems into the appropriate form for logical interfacing with the network, while the Diagnostician generates possible and plausible diagnoses of the observed fault conditions, together with explanations. This information concerns the "ultimate causes" of the network misbehavior, in contrast to the deductions of the other expert systems, which are at a lower level.

The aforesaid communication means by means of which information can be passed between the expert systems is preferably constituted by an electronic blackboard accessible to all expert systems to provide for general intercommunication between the expert systems. Although each expert system can preferably utilize suggestions placed on the electronic blackboard by any other expert system, in practice there is likely to be a roughly cyclic sequence of activation among certain of the expert systems, these being, with reference to the aforementioned expert systems, the Usage Advisor, the Operations Assistant, and the Expert Commentator. Advantageously, the electronic blackboard is also accessible to the user, via the user interface, so as to enable the user to control the utilization of the various items of the electronic blackboard contents by the expert systems and preferably also the sequence of activation of the expert systems. Preferably, the user can also add, delete or modify blackboard items for the expert systems to use.

The different expert systems may utilize different types of inference, e.g. rule-based or procedural, and their inference techniques may range from simple item matching to complex deep modelling. It is possible for some or all of the expert systems to themselves be electronic blackboard based, utilizing knowledge bases which may be shared partially or wholly by the different expert systems.

According to another aspect of the present invention, there is provided an apparatus for analyzing faults on a message network, where the apparatus comprises a network interface for coupling the apparatus to the network, expert system means for monitoring and interacting with the network through the network interface for the purpose of analyzing faults on the network, and a user interface for outputting to the user fault-analysis information provided by the expert system means. Preferably, the expert system means comprises a plurality of individual expert systems and communication means by means of which information can be passed between respective expert systems, where the communication means comprises an electronic blackboard to which the expert system outputs are posted for access both by one another and, via the user interface, by the user. In accordance with a preferred embodiment, such an expert system preferably comprises a Fault Recognizer responsive to the network's behavior independent of test stimuli so as to identify network problems therefrom; a Usage Advisor operative to produce proposals for tests on the network through the network interface; an Expert Commentator responsive to the network's behavior resulting from the test to identify higher level fault behavior information; and a Diagnostician responsive to the network problems and/or the higher level behavior information to generate fault hypotheses therefrom. Preferably, the Usage Advisor produces its test proposals on the basis of the network problems and/or the higher level fault behavior information and/or the fault hypotheses.

According to a further aspect of the present invention, there is provided a system for testing a message network, characterized in that the system comprises processing means located at a fixed location on the network and a portable instrument which comprises a user interface through which a user of the instrument can initiate network testing and can receive back results of such testing, and a network interface for coupling the instrument to the network and through which the instrument can exchange messages with the processing means. Preferably, the network interface includes monitoring means for monitoring the behavior of the network and outputting messages containing monitoring information to the processing means and further comprises test-signal means for generating test signals onto the network in response to messages received from the processing means. Preferably, the processing means further comprises analyzing means for analyzing the monitoring information and outputting results of this analysis back to the instrument to initiate further testing by the test-signal means and/or to provide test results to the user through the user interface.

BRIEF DESCRIPTION OF THE DRAWINGS

A network analysis apparatus embodying the present invention will now be described, by way of a non-limiting example, with reference to the accompanying diagrammatic drawings, in which:

FIG. 3 is a network diagram illustrating a two-part physical organization of the apparatus of the invention.

DETAILED DESCRIPTION OF THE INVENTION

Basic Conceptual Organization

Figure 1:
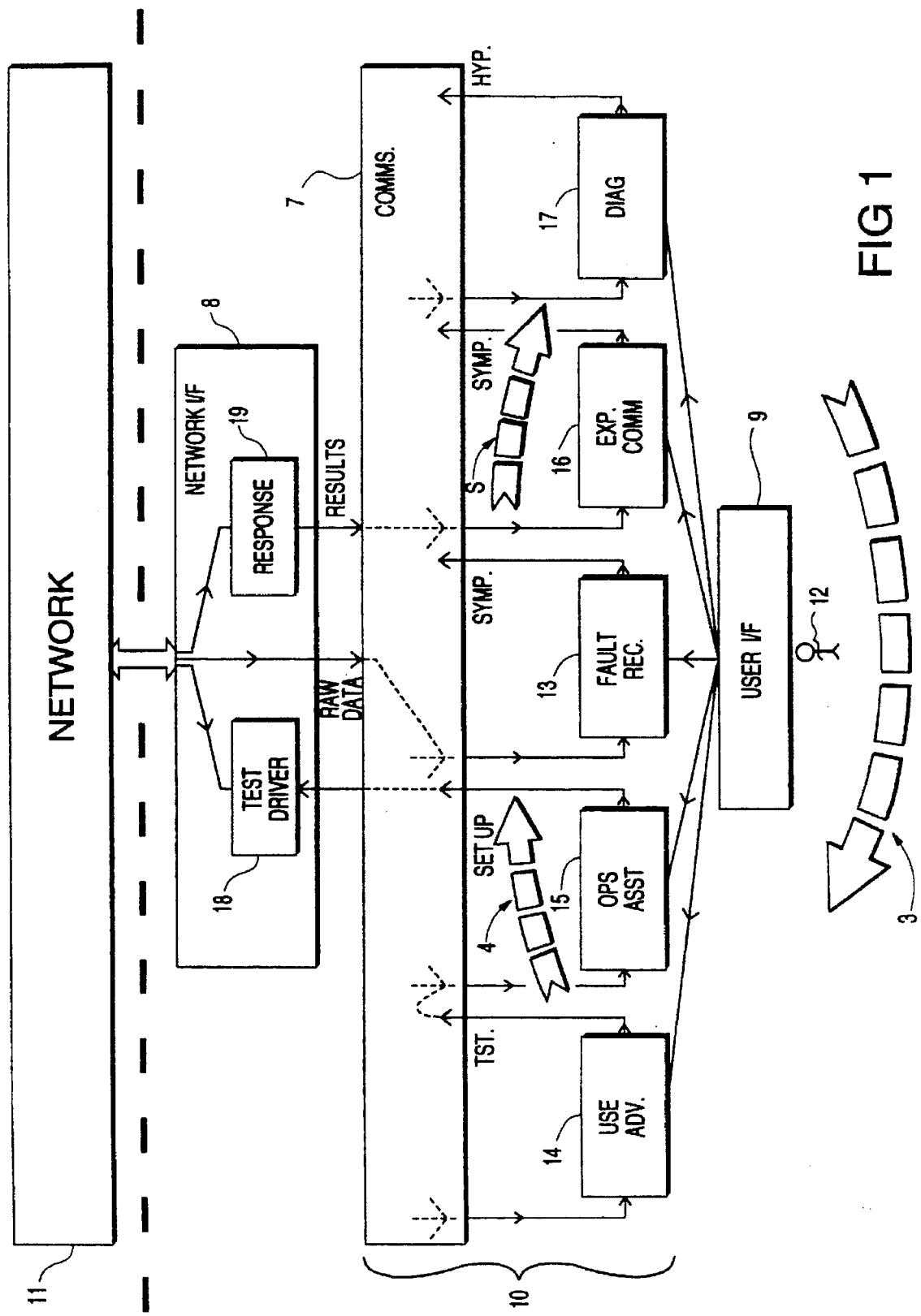
FIG. 1 is a block diagram of the conceptual organization of the apparatus of the invention.

FIG. 1 is a block diagram illustrating the conceptual organization of the apparatus of the invention and its relationship with the network 11 to be examined. As will be apparent from the following, the physical/logical organization of the system (FIG. 2) differs to some extent from the conceptual organization illustrated in FIG. 1.

The present network analysis apparatus is primarily intended to be a hand-portable instrument which can be taken to a suitable place in a network and connected there. It will then monitor the packets passing along the link to which it is connected. As illustrated in FIG. 1, such an apparatus basically comprises a network interface 8 with test and measurement functionality embodied in a test drive unit 18 and a response unit 19, a user interface 9, and an expert system section 10. The expert system 10 preferably consists of five major units 13–17 or "Consultants", each of which is an expert system, and communication means 7 by which information can be transferred between the expert systems 13–17. The expert systems 13–17 are largely independent and self-contained in the sense that each may operate and be used by the user 12 independently of the others, although, as will be seen, they are preferably used in combination. The different Consultants may utilize different types of inference. Thus, some may be rule-based and others procedural, and some may utilize simple pattern matching while others may utilize complex deep modelling.

The communication means 7 provides for the passing of information between the Consultants 13 to 17 themselves and between the Consultants 13–17 and the rest of the apparatus. Since the Consultants 13–17 are very specific in their implementation and only use particular types of information coming from particular sources, then the communication means 7 can be made equally specific. However, preferably the communications means 7 is made general in nature (e.g., as an electronic blackboard) to provide at least the potential for any of the Consultants 13–17 to utilize information provided by any of the other Consultants 13–17. For this reason, in FIG. 1 the input lines into the Consultants 13 to 17 have been shown as starting with plural dashed roots within the communication means 7 and generally without specific linkages to particular information sources. Certain linkages are, nevertheless, natural and these have been indicated by appropriate termination of the input-line roots.

The role played by each Consultant 13–17 will now be described.

Unit 13 is a Fault Recognizer, which is fed with Raw Data and identifies network Problems. More specifically, this unit monitors the operational behavior (independent of special test stimuli) of the network 11 via the network interface 8 and also receives information from the user 12, via the user interface 9, indicating that particular aspects of the network are causing concern. From these inputs, this unit generates Problems—that is, perceived non-optimal conditions. Problems are a sub-class of Symptoms, as will be described in more detail below. The Fault Recognizer 13 observes a "snap-shot" of the network activity and determines from that what the most likely user complaints probably are.

Unit 14 is a Usage Advisor, which produces Test and Measurement recommendations. Typically, it generates its recommendations from the Problems identified by the Fault Recognizer and/or Symptoms generated by the Expert Commentator 16, and/or Hypotheses generated by the Diagnostician 17 as to the likely causes of these Problems/Symptoms.

Unit 15 is an Operations Assistant which is fed with the Test and Measurement recommendations (together, possibly, with other information) and generates therefrom the Set-Up information, this being the information regarding the appropriate manner in which to set up the test and measurement units 18, 19 for carrying out Tests which will implement the Test and Measurement recommendations. This unit also may provide assistance to the user in programming the apparatus to capture specific types of situations or conditions. Preferably, the Operations Assistant 15 sets up the test and measurement units 18, 19 automatically, at least partially, to carry out such Tests or programs, while the test drive unit 18 actually generates the required test signals which are fed to the network 11.

Unit 16 is an Expert Commentator which is fed with the results of the Tests and Measurements actually carried out (together, possibly, with other information). These results are provided by test response unit 19. The unit 16 identifies fault symptoms, descriptions, and explanations (Symptoms) from its inputs. It interprets the results of the Tests and Measurements carried out, producing or abstracting from them their "meaning". These outputs include indications of features of the network which appear to be working correctly, as well as features which appear to be at fault.

Generally with regard to Symptoms it should be noted that Problems are a subset or special class of Symptoms, but the Problems generated by the Fault Recognizer 13 are generally higher level information than the Symptoms generated by the Expert Commentator 16. A Problem is always something which is directly observable by the user and is always indicative of some fault condition of the network. Thus "Cannot transfer files from node A to node B" is a Problem, because it is a fault condition which is directly observable; it is also a Symptom—a relatively high level descriptions or explanation of the condition. "Network error rate too high" is a Symptom, but is not a Problem, because that is not something directly observable by the user—it is a deduction from observed characteristics. "Log-in to node C is possible" is also a Symptom but not a Problem, as it is not a fault condition.

The final unit is Unit 17, which is a Diagnostician. This unit is typically fed with the Symptoms and other high level behavior information from the Expert Commentator 16 and generates from them Hypotheses or explanations which are statements of possible and plausible fault conditions together with explanations. This information concerns the "ultimate causes" of the network misbehavior and is global in the sense of encapsulating the knowledge (and the hypotheses deduced therefrom) of the apparatus as a whole. It differs from the information generated by the other four units in that those units help the user to characterize a fault, whereas the Diagnostician 17 helps him or her to identify it.

It will be appreciated that there is no fixed order of operation of the Consultants 13–17, and generally each will be triggered into activity as relevant new information becomes available to it. Initially, when the apparatus is connected to the network 11, the Fault Recognizer 13 will typically be the first Consultant to operate as it identifies a Problem on the network. The provision of the Fault Recognizer can thus be seen to be of considerable assistance to the user as it allows the apparatus to get started on its analysis and diagnosis of the network without the user having to explicitly generate and enter any initial Symptoms. In a sense, this allows the user to demonstrate the shortcomings of the network to the apparatus rather than having to tell the apparatus what those shortcomings are.

Upon an initial Problem identification, the Diagnostician 17 may produce a Hypothesis. The Usage Advisor 14 will next typically use the problem and/or Hypothesis to generate initial recommendations for testing. The Operations Assistant 15 then proposes a test and measurement set up and, assuming this is implemented, a test is effected. The Expert Commentator 16 is then triggered to analyze the results of the tests to produce Symptoms. The Diagnostician 17 may now produce a new Hypothesis and this, in turn, may trigger further consultant activity stimulating further tests.

Once an initial flurry of activity has died down, generally a loop of activity becomes established involving the Usage Advisor 14 proposing a test, the Operations Assistant 15 suggesting how to make the test, the test being carried out through the units 18, 19, the Expert Commentator 16 analyzing the test results and the Diagnostician 17 possibly updating its Hypotheses. This activity loop is indicated by the large dashed arrows 3,4,5 in FIG. 1. In due course, the Consultants 13–17 gradually narrow down onto the faults of the network as more information is gained on each pass through the loop.

With regard to the user interface 9 shown in FIG. 1, this provides a means by which the user 12 can access each of the Consultants 13 to 17. This access could simply be for the purpose of inspecting the chain of reasoning followed by the apparatus when deciding to conduct a particular test or when deriving a particular hypothesis. However, the user interface 9 preferably also permits the user to play an active role in the analysis and testing procedure by adding, modifying and removing information as appropriate. Thus, for example, the user may know that a particular bridge in the network 11 is not functioning and this information can be input into the relevant Consultants or, more generally, shared between all Consultants via the communications means 7. From the foregoing, it will be appreciated that the apparatus assists the user at substantially all stages of fault finding, while permitting the user to control and adjust the operation of the apparatus and to utilize his or her own knowledge, again at substantially all stages of the operation.

Logical Organization

Figure 2:
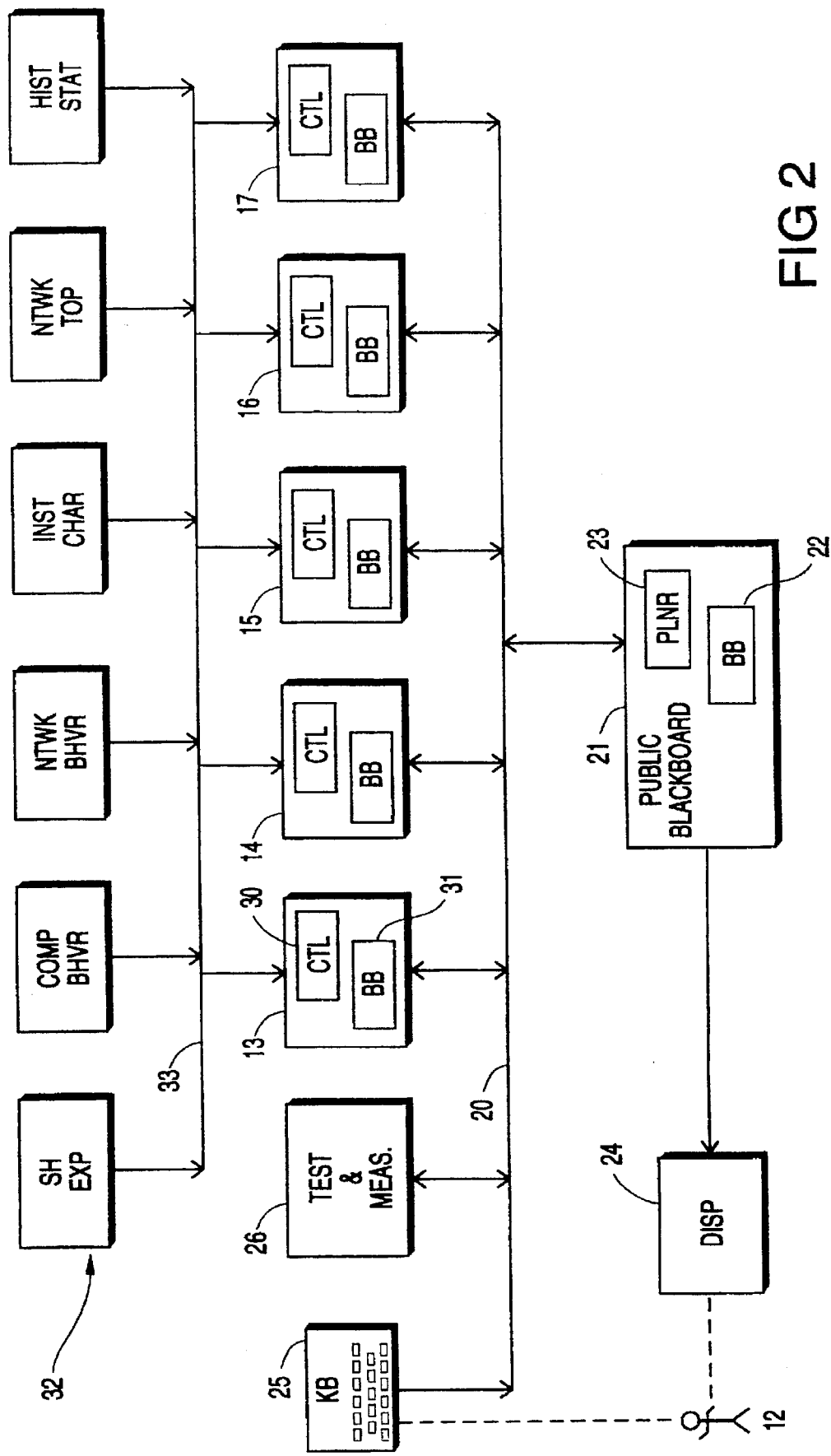
FIG. 2 is a block diagram of the logical organization of the apparatus of the invention.

FIG. 2 is a block diagram showing a possible logical organization of the expert system portion 10 of the apparatus of FIG. 1. The five Consultants 13 to 17 are all coupled via a bus 20 to a Public Blackboard unit 21, which consists of an electronic blackboard 22 and a planner unit 23. The various Consultants 13–17 all post their output propositions onto this common blackboard 22. Thus each Consultant is able to utilize the propositions produced so far by the other Consultants in reaching new and more precise propositions of its own. The Blackboard Unit 21 thus constitutes the communication means 7 of FIG. 1.

The planner unit 23 in the Public Blackboard unit 21 controls the sequencing of the operation of the Consultants 13–17, in dependence on the nature of the Consultants 13–17 and the contents of the blackboard 22. There is no rigid sequencing, and the Consultants 13–17 can operate in any order. In fact, it is possible to omit the planner unit 23 and allow all the Consultants 13–17 to operate substantially in parallel. In practice, however, the Fault Recognizer 13 will normally be active early on; the Usage Adviser 14, the Operations Assistant 15, and the Expert Commentator 16 will operate in cyclic sequence several times; and the Diagnostician 17 will operate throughout.

The user 12 is also coupled into the expert system section 10 by means of a display unit 24, which shows the contents of the blackboard 22, and a keyboard 25 coupled to the bus 20 and by means of which the user 12 can enter data into the blackboard 22. Other suitable input devices, such a mouse, can also be used. The display unit 24 and keyboard 25 form part of the User Interface 9 of FIG. 1. At each stage of the operation of the apparatus—that is, each time one of the Consultants 13–17 has drawn what propositions it can from the information currently available to it and posted those propositions on the blackboard 22—the user 12 has the option of controlling the future operation of the apparatus.

This user control can take various forms. The user 12 can assess the validity of the propositions being generated by the Consultants 13–17 and delete any which he or she thinks to be wrong, or, more generally, adjust the probabilities and/or importance assigned to those propositions. The user can add propositions which the Consultants 13–17 have not generated. These added propositions may be ones which the Consultants 13–17 have failed to deduce, or they may be based on knowledge which is not available to the Consultants 13–17. For example, the user 12 may know that some particular part of the network has probably failed because of a power failure or a lighting strike, or the user 12 may have more detailed information on some aspect of the topology of the particular network under test than the apparatus has. Further, the user can control the sequencing and operation of the Consultants 13–17 and, in particular, the cycling of the Usage Adviser 14, the Operations Assistant 15, and the Expert Commentator 16.

The blackboard 22 can conveniently generate a display in the form of a public window on which all statements are displayed, together with a set of windows one for each Consultant (selectable with the aid of corresponding icons and a mouse). A convenient method of operation would be for each Consultant to generate one or more statements (propositions/deductions), each with some degree of "likelihood" (of either being right or being useful), with those having a high likelihood being transferred automatically to the public window and those with a somewhat lower degree of likelihood being shown only in that Consultant's window. The user would be able to edit statements, delete statements from the public window, and copy low likelihood statements from a Consultant's window to the public window.

Each of the Consultants 13 to 17 is, as discussed above, an expert system. As shown in FIG. 2, each of the Consultants 13–17 may conveniently be constructed as a control unit 30 and a blackboard unit 31. The blackboard unit 31 is used to contain the information used by the expert system, and the control unit 30 is used to perform the inferences performed by the expert system. The control unit 30 also acts to some extent as a knowledge source, holding knowledge about how to use knowledge about networks in order to perform the particular task of the Consultant.

The blackboards 31 of the Consultants are coupled to a set of six knowledge bases 32 via a bus 33. The six knowledge bases contain information regarding, respectively, shallow/ experiential information regarding the network (SH EXP), component behavior information regarding the behavior of the components of the network (COMP BHVR), network behavior information regarding the behavior of the network as a whole (NTWK BHVR), instrument characteristics regarding the behavior of the network analysis apparatus itself (INST CHAR), network topology information (NTWK TOP), and historical and statistical information regarding the past behavior of the network (HIST STAT).

The control units 30 of the Consultants 13–17 not only perform inference deduction, as discussed above, but also extract relevant information from the knowledge bases 32. Any Consultant can obtain information from any knowledge base, though in practice the Consultants will differ in their usage of the knowledge bases. For example, the Operations Assistant 15 is unlikely to require knowledge from the network behavior information knowledge base, the network topology information knowledge base, or the historical and statistical information knowledge base.

The user 12 can of course contribute information to the individual Consultants 13–17. It would be possible for the user 12 to be able to designate a particular item of information as for the use of only a particular Consultant, but it will generally not be necessary to provide that facility. It would also be possible to couple the user 12 to bus 33, but that also will generally not be necessary. It is generally convenient for all user information to be entered via the Public Blackboard unit 21. Information entered into Public Blackboard unit 21 is of course available to all Consultants, but information relevant to only a particular Consultant will of course be used by that Consultant and will be ignored by the other Consultants.

The test and measurement functionality of the apparatus is also illustrated in FIG. 2 as a unit 26 connected to the bus 20. Such an arrangement permits the test and measurement functionality to be controlled directly by the Operational Assistant 15 as well as enabling data on the network's behavior to be passed to the blackboard unit 21.

Implementation Details

The FIG. 2 expert system section as just described is of considerable generality, and in practice, it may be specialized and simplified in a number of respects. The Consultants may operate individually and also co-operate among themselves in a relatively simple manner, with the possible Symptoms, Tests, and Hypotheses being in effect enumerated as fixed lists. The functionality of the apparatus would thus be effectively fixed.

The various types of messages generated by the Consultants 13–17 can be broadly classified into four types:

Symptoms, Test and Measurement Requests, Test and Measurement Results, and Hypotheses. These four types of messages will all be displayed on the public blackboard unit 21, preferably in four separate sections of the blackboard. The distinctions between these different types of message are broadly as follows:

Symptoms: These are medium level statements about the behavior or state of the network, higher than Test and Measurement Results but lower than Hypotheses. Problems are a special class of Symptoms. Examples are:
CRC error rate too high on node X.
Node X unreachable from node Y.

Test and Measurement Requests: These are suggestions, generated either by the system or by the user 12, about what to test in the light of the current Symptoms and Fault Hypotheses. Examples are:
Measure CRC error rate on node X.
Look for packets flowing between nodes X and Y for time T.

Test and Measurement Results: These are statements about fault-related network behavior at a lower (less abstracted) level than Symptoms. Examples are:
CRC error rate on node X is p.
n packets flowed between nodes X and Y in period T.

Hypotheses: These are high level statements of possible causes of faults on the network, generally with an indication of its "probability" or chance (possibly numerical or possibly high", "likely", "possible", etc.) of actually being present. Examples are:
Cable probably broken near node X.
Node X down with probability 70%. It will be understood that the apparatus will substitute the appropriate "values" (time periods, probabilities, node identifiers, etc.) in the statements, and that although the statements are formulated above in ordinary English, they will normally be implemented in a suitable formal language. The system may then include means for converting such statements from the internal representation or format to a representation or format closer to natural language for display to the user.

The Consultants interact with each other by means of messages. A minimal set of interactions between them can be summarized as follows:

| Inputs | Consultant | Outputs |
| --- | --- | --- |
| Raw Data | Fault Recognizer 13 | Symptoms |
| Hypotheses + (Test Requests) | Usage Advisor 14 | Test Requests |
| Test Requests | Operations Assistant 15 | Programs |
| Programs | T & M Functionality 26 | Test Results |
| Test Results | Expert Commentator 16 | Symptoms |
| Symptoms | Diagnostician 17 | Hypotheses |

It will be noted that in addition to the four types of messages discussed above, there is a fifth type of output from the Consultants 13–17. Namely, programs, which are the Set-Up information mentioned above, are generated by the Operations Assistant Consultant 15 and will generally be sent directly to the Test and Measurement Unit 26, which corresponds roughly to the units 18 and 19 of FIG. 1. They therefore do not normally appear on the Public Blackboard 21 although this is, of course, possible.

It will also be noted that while most of the Consultants 13–17 can operate, at a minimum, with inputs from only one source, the Usage Advisor 14 is shown as receiving Test Requests (generated by itself) as well as Hypotheses. This represents a memory function, for the Usage Advisor 14 should remember what Tests it has already recommended so that it does not recommend the same Test again.

It will also be noted that the input to the Fault Recognizer 13 is shown as Raw Data. The Raw Data can be regarded as a specialized type of Test Result produced by the network 11 in response to a kind of Test Request, such as "Listen to network". However, the Fault Recognizer 13 is not involved in an iterative loop in the kind of way that the Usage Advisor 14, Operations Assistant 15, Expert Commentator 16, and Diagnostician 17 are. Rather, it is concerned more with the initial stages of getting the analysis started.

A simple form for the Consultants 13–17 uses, as noted above, what amounts to fixed listings. For the Usage Advisor 14, Operations Assistant 15, and Diagnostician 17, the items in the listings could be of the form "A IF P OR Q OR . . . ". Thus for the Usage Advisor 14, a typical item could be of the form "Test1 IF Hypothesis1 OR Hypothesis2". For the Fault Recognizer 13 and the Expert Commentator 16, the items could be of the same general form, but generalized to allow Boolean combinations and numerical comparisons (e.g. "Symptom1 IF (Result1 AND Result2) OR (Result3>12)").

More specifically, typical rules might be as follows:

| Fault Recognizer 13 | | |
|---|---|---|
| Symptom | IF | Test Results |
| Bad performance | | IF (network delay > 300) OR timeouts |
| Can't login to node X | | IF timeouts on node X |
| Usae Advisor 14 | | |
| Test Request | | IF Hypotheses |
| Check node X manually | | IF (Node X down) OR (node X unreachable) |
| Perform TDR test | | IF (terminator missing) OR (impedance mismatch) |
| Expert Commentator 16 | | |
| Symptom | IF | Test Results |
| CRC rate too high | | IF CRC rate > 25 |
| Node X unreachable | | IF Can't pin node X |

For the Diagnostician 17, a pattern matching technique might be more appropriate. The simplest form of this is a list in which each item is a Hypothesis together with a set of Symptoms with means for determining for each item in the list the ratio: (Symptoms present)/(Number of Symptoms in the set). Those items giving a ratio above a preset limit, or those giving the n highest ratios (where n is a small integer), could be displayed together with their ratio values as rough "probabilities". More elaborate pattern matching techniques can obviously be employed.

The Operations Assistant 15, on the other hand, can be implemented by means of a look-up table, in which all possible Tests are listed with the appropriate program or Set-Up for performing the Test given against each Test.

EXAMPLE OF OPERATION

A specific example of the manner in which the apparatus of the invention operates will now be given in simplified and informal form. It consists essentially of ten stages. For each stage, the input to the relevant Consultant, the Consultant, and the output from that Consultant are given, followed by comments on that stage.

| 1 | Network delay is 20 s Network delay too large | Fault Recognizer 13 | |
|---|---|---|---|

This is the result of the user demonstrating the fault to the apparatus. The Fault Recognizer 13 responds to this by producing the initial Symptom that the network delay is too large.

| 2 | Network delay too large Broadcast storm? | Diagnostician 17 | |
|---|---|---|---|

This initial Symptom of the network delay being too large enables the Diagnostician 17 to suggest the Hypothesis of a broadcast storm. The Hypothesis is proposed with a question mark attached, indicating that there is only a partial match between the set of conditions for this Hypothesis and the actual conditions (network delay too large).

| 3 | Broadcast storm? Monitor traffic | Usage Advisor 14 | |
|---|---|---|---|

From this Hypothesis, the Usage Advisor 14 suggests monitoring the network traffic.

| 4 | Monitor traffic | Operations Assistant 15 [T & M Set-Up] |
|---|---|---|

The Test Request or suggestion from the Usage Advisor 14 is converted into an actual test and measurement Set-Up or program by the Operations Assistant.

| 5 | [T & M Set-Up] [Results] | T & M Functionality 26 |
|---|---|---|

The Test is performed (either with or without user intervention), and as a result, the T & M unit 26 makes the appropriate measurements, resulting in some numerical results.

| 6 | Test Results | Commentator 16 | Peaky broadcasts, ARP problem |
|---|---|---|---|

The numerical results are analyzed by the Expert Commentator, which as a result produces two more Symptoms, peaky broadcasts and ARP problem.

| 7 | Broadcast storm? AND Monitor traffic | Usage Advisor 14 | Look in log |
|---|---|---|---|

The original Hypothesis is still present on the Blackboard. The Usage Advisor 14 uses this, together with the fact that a Test has been performed, to suggest a further Test.

| 8 | Look in log node X | User 12 | New |
|---|---|---|---|

The Test suggested is one which the user must perform personally, entering the result into the Blackboard.

| 9 | Network delay too large AND new node X Broadcast storm | Diagnostician 17 | |
|---|---|---|---|

The new Symptom (entered by the user), together with the already existing Symptom that the network delay is too large, enables the Diagnostician 17 to confirm the Hypothesis of a broadcast storm. This time the match is perfect, so the Hypothesis is no longer doubtful and the question mark is deleted.

| 10 | Broadcast storm | Usage Advisor 14 | Turn off node X |
|---|---|---|---|

Given the certainty of the Hypothesis, the Usage Advisor 14 suggests a "Test" which will actually remove the fault from the network.

It is clear that the user can choose to disregard the suggestions made by the apparatus at any stage. In particular, the final "Test" may be disregarded and node X serviced instead. Also, it will be realized that the apparatus will usually not be able to deal with faults which have not been thought of by the designer of the system (i.e., the composer of the expert systems of the various Consultants). If such a fault occurs, the apparatus can be expected to "track" the fault up to a point, but it is then liable to veer away from the fault, start suggesting inappropriate Hypotheses and Symptoms, and either run out of suggestions or possibly "oscillate" with inconsistent suggestions. The planner 23 may be arranged to recognize this and abort the diagnosis.

Impovements

A variety of improvements may be made over the simple system described under "Implementation details" above. For example, the three Consultants: Usage Advisor 14, Operations Assistant 15, and Diagnostician 17 were described as being rule based using very simple rules using only logical ORing of inputs of a single type. In practice, it would normally be desirable to permit a more elaborate form for the rules. Thus, more complicated logical combinations could be allowed, as described above for the Expert Commentator 16. As a further step, pattern matching techniques could be permitted, as described for the Diagnostician 17.

The Consultants 13–17 can be implemented by either procedural or declarative techniques. The comments of the preceding paragraph assume that a declarative technique is used, but a procedural technique also could be used. A more advanced development would be to introduce more reliance on probability, uncertainty, and model-based reasoning.

Another way in which the Consultants 13–17 could usefully have their capabilities expanded would be to allow them to utilize more than one type of input. Thus the rules in the Expert Commentator 16, for example, might incorporate not only the results of the Tests but also some of the possible Hypotheses which may appear on the blackboard. Similarly, all the Consultants 13–17 could both utilize probabilities in their inputs and generate probabilities for their outputs. It is also desirable for the system to be able to "review" propositions already generated and to adjust their probabilities in the light of further information.

A "model" of the network may be included in the form of a network map to which one or more Consultants 13–17 may have access, thereby helping the Consultants 13–17 to fill in parameters for specific faults, symptoms, tests, and the like and also helping in the provision of explanations to the user.

Although the network interface 8 of the above-described apparatus includes test and measurement functionality in the form of the units 18 and 19 of FIG. 1 (unit 26 of FIG. 2), the apparatus can be arranged to access additional test and measurement present in remote network resources. Indeed, the apparatus could be arranged to rely entirely on such remote test and measurements functionality, although this is not preferred.

Distributed Functionality

It will be realized that the present apparatus is of considerable complexity and may be expensive. Also, it may require a physically large instrument. It is therefore contemplated that the apparatus may include a portable instrument which incorporates only a part of the whole apparatus, with the remainder of the apparatus (essentially, parts of the computational portions of the apparatus) resident in a computer attached to the network to be investigated. The instrument will be connected to the network segment to be monitored so as to monitor that segment. It will also be connected to the network as a communication device in its own right, and will thereby communicate with the computational part of the apparatus (resident in a computer attached to the network as just noted). Such an arrangement is illustrated in FIG. 3.

More particularly, FIG. 3 depicts a network comprising a main 'backbone' network segment 40 and two subsidiary network segments 41, 42 interconnected with the segment 40 through respective bridges 43, 44. A number of stations 45 to 49 are distributed over the network. The network analysis apparatus is provided in two parts as already described, namely, a portable instrument part 50 and the expert system part 60 installed on the network station 49. The portable instrument part 50 comprises a user interface 55 of the apparatus and a network interface made up of various elements 51 to 54. Elements 51 and 52 are message transmission and message reception units, respectively, by means of which the instrument part 50 can communicate with the expert system part 60 over the network. Elements 53 and 54 are network monitoring and test-signal generation units respectively for monitoring and testing the network.

In operation of the FIG. 3 arrangement, the instrument part 50 is connected to the network segment to be tested. The user then initiates testing through the user interface 55. User inputs and information on network behavior as monitored by the unit 53 are passed via the message transmission unit 53 and the network to the expert system part 60 installed on station 49. Messages from the expert system part 60 are passed back over the network to the instrument part 50 to set up the units 53, 54 and to inform the user of the current 'thinking' of the Consultants 13–17. Provision may also be made for the user to directly control the units 53 and 54 to enable network testing independently of the expert system part 60. Such provision is indicated by the dashed lines between the units 53, 54 and the user interface 55 in FIG. 3. The expert system part 60, as well as instigating testing (including monitoring) by the instrument part 50, may also instigate testing by other network resources (such as the bridge 43 which could be arranged to collect relevant traffic statistics).

The division of the network analysis apparatus into a portable part and an expert-system part at a fixed network station requires, of course, that the network has not failed so seriously that such communication is impossible. However, this requirement will usually be met. If the network has failed that seriously, then the diagnosis of the nature of the failure is likely to be relatively easy, for it is "soft" and subtle faults causing degradation of performance without outright failure of some part of the network which present the greatest difficulties in diagnosis. The present invention is most useful for diagnosing such faults.

I claim:

1. An apparatus for analyzing faults on a message network, comprising:

a network interface for coupling the apparatus to the message network;

expert system means for monitoring and interacting with the message network through the network interface for the purpose of analyzing faults on the message network, said expert system means comprising a plurality of individual expert systems and communication means by means of which fault-analysis information is passed between the individual expert systems, each said individual expert system being operative to carry out a respective operation involved in the analysis of any given network fault, with a first group of one or more of said expert systems being involved in the instigation of tests on said message network through said network interface, and a second group of one or more of said individual expert systems being involved in monitoring the message network through said network interface and in analyzing the message network's behavior including behavior exhibited in response to said tests, said communication means providing fault-analysis information from said second group back to said first group to enable the latter to instigate tests taking account of the message network's behavior; and a user interface for outputting to a user of the apparatus fault-analysis information provided by the expert system means, said user interface providing user access to at least one said individual expert system in each of said groups in such a manner that each such expert system can be used both in a stand alone, advisory role by the user and for receiving user input which the expert system then utilizes in cooperation with other of said expert systems.

2. Apparatus according to claim 1, wherein said network interface includes test and measurement means for carrying out said tests, said test and measurement means being controllable directly by at least one of said first group and the user so as to carry out tests proposed by said first group.

3. An apparatus according to claim 1, wherein the first group is operative to output test requests over the message network requesting remote resources to carry out said tests.

4. An apparatus according to claim 1, wherein said first group comprises the following expert systems:

a Usage Advisor operative to produce proposals for said tests, including observing particular conditions in the message network; and an Operations Assistant which generates information regarding the appropriate manner in which to carry out said tests.

5. An apparatus according to claim 4, wherein the user can access the Usage Advisor and the Operations Assistant through said user interface so as to be able to propose tests independently of said Usage Advisor and have said Operations Assistant generate fault-analysis information regarding how to carry out the user-proposed tests and to have the Usage Advisor propose tests and then carry out the tests independently of the Operations Assistant.

6. An apparatus according to claim 1, wherein said second group comprises the following expert systems:

a Fault Recognizer responsive to the message network's behavior independent of test stimuli so as to identify network problems therefrom;

an Expert Commentator responsive to the message network's behavior resulting from a test so as to identify higher level fault behavior information; and a Diagnostician which is fed with at least one of said network problems and said higher level behavior information and generates fault hypotheses therefrom.

7. An apparatus according to claim 1, wherein the user interface includes means for enabling the user to monitor the activity of each said individual expert system.

8. An apparatus according to claim 1, wherein the user interface includes means for controlling the fault-analysis information passing between at least some of said individual expert systems and their interactions.

9. An apparatus according to claim 1, wherein said communications means includes an electronic blackboard accessible to all said individual expert systems and operative to provide general inter-communication between said individual expert systems.

10. An apparatus according to claim 9, wherein said electronic blackboard is further accessible to said user interface and said user interface is operative to allow the user to modify, delete and add items to said electronic blackboard for use by said expert systems.

11. An apparatus according to claim 1, further comprising knowledge bases which are shared at least partially by said individual expert systems.

12. An apparatus according to claim 1, further comprising portable housing means for housing said apparatus.

13. An apparatus according to claim 1, wherein said apparatus is physically arranged into at least two parts comprising a portable part couplable to the message network and including said user interface, and a centralized part containing at least some of the individual expert systems, said centralized part being located at at least one fixed location in said message network and communicating with said portable part through said message network.

14. A system for testing a message network, comprising:

processing means located at a fixed location on the message network; and a portable instrument comprising:

a user interface through which a user of the instrument can initiate network testing and can receive back results of such testing, a network interface for coupling the instrument to the message network and through which the instrument can exchange messages with said processing means, said network interface including monitoring means for monitoring the behavior of the message network and outputting messages containing monitoring information to said processing means, and test-signal means for generating test signals onto the message network in response to messages received from said processing means, wherein said processing means comprises analyzing means for analyzing said monitoring information and outputting results of this analysis back to the instrument to perform at least one of initiating further testing by the test-signal means and providing test results to said user through said user interface.

* * * * *